United States Patent
Bak et al.

(10) Patent No.: US 12,264,621 B2
(45) Date of Patent: Apr. 1, 2025

(54) GAS TURBINE PLANT WITH AMMONIA DECOMPOSITION SYSTEM

(71) Applicant: DOOSAN ENERBILITY CO., LTD., Changwon-si (KR)

(72) Inventors: Byoung Gu Bak, Suwon-si (KR); Tae Woo Kim, Yongin-si (KR); Hong Geun Ha, Yongin-si (KR)

(73) Assignee: Doosan Enerbility Co., Ltd., Changwon-si (KR)

( * ) Notice: Subject to any disclaimer, the term of this patent is extended or adjusted under 35 U.S.C. 154(b) by 0 days.

(21) Appl. No.: 18/665,376

(22) Filed: May 15, 2024

(65) Prior Publication Data
US 2024/0401521 A1 Dec. 5, 2024

(30) Foreign Application Priority Data

May 30, 2023 (KR) .................. 10-2023-0069526
Jul. 11, 2023 (KR) .................. 10-2023-0089992

(51) Int. Cl.
*F02C 7/224* (2006.01)
*F02C 3/20* (2006.01)
*F02C 3/24* (2006.01)
*F02C 6/18* (2006.01)
*F01K 23/10* (2006.01)

(52) U.S. Cl.
CPC ............ *F02C 3/24* (2013.01); *F02C 3/20* (2013.01); *F02C 6/18* (2013.01); *F02C 7/224* (2013.01); *F01K 23/106* (2013.01); *F05D 2220/62* (2013.01); *F05D 2240/36* (2013.01)

(58) Field of Classification Search
CPC ...... F02C 3/20; F02C 3/24; F02C 6/18; F02C 7/08; F02C 7/10; F02C 7/22; F02C 7/224; F01K 23/10
See application file for complete search history.

(56) References Cited

U.S. PATENT DOCUMENTS

| | | |
|---|---|---|
| 11,156,168 B2 | 10/2021 | Nose |
| 11,679,977 B2 | 6/2023 | Al-Huwaider |
| 11,939,915 B2 | 3/2024 | Uechi et al. |
| 2007/0214766 A1* | 9/2007 | Obana .......... F02C 7/143 60/39.15 |
| 2009/0133400 A1 | 5/2009 | Callas |
| 2018/0355794 A1 | 12/2018 | Bulat |
| 2019/0084831 A1 | 3/2019 | Andersen |
| 2019/0107048 A1 | 4/2019 | Bulat |
| 2020/0032676 A1 | 1/2020 | Nose |
| 2021/0332759 A1* | 10/2021 | Smith .......... F02C 7/224 |
| 2022/0099021 A1* | 3/2022 | Uechi .......... F01K 7/18 |

(Continued)

FOREIGN PATENT DOCUMENTS

JP 2948351 B2 9/1999

*Primary Examiner* — William H Rodriguez
(74) *Attorney, Agent, or Firm* — Shook, Hardy & Bacon L.L.P.

(57) ABSTRACT

The present disclosure relates to a gas turbine plant which decomposes ammonia into a decomposition gas including hydrogen and supplies the decomposition gas as fuel to a combustor of the gas turbine. The gas turbine plant supplies sufficient heat to the ammonia in order to thermally decompose the ammonia effectively and separates the residual ammonia present in the decomposition gas and supplies the decomposition gas to a combustor of the gas turbine.

18 Claims, 5 Drawing Sheets

(56) References Cited

U.S. PATENT DOCUMENTS

| | | | |
|---|---|---|---|
| 2022/0154646 A1* | 5/2022 | Araki | C01B 3/047 |
| 2022/0162989 A1* | 5/2022 | Cocks | F23R 3/36 |
| 2022/0162999 A1* | 5/2022 | Cocks | F02C 3/22 |
| 2022/0299205 A1* | 9/2022 | MacDonald | F02C 6/003 |
| 2023/0129294 A1* | 4/2023 | Cocks | F02C 3/04 |
| | | | 60/39.12 |
| 2023/0313735 A1* | 10/2023 | Smith | F23R 3/30 |
| | | | 60/359 |
| 2023/0407784 A1* | 12/2023 | Takeishi | F02C 7/224 |
| 2024/0019124 A1* | 1/2024 | Ito | F02C 3/24 |
| 2024/0068416 A1* | 2/2024 | Hagita | F02C 9/50 |
| 2024/0093639 A1* | 3/2024 | Ikeda | F02C 7/224 |
| 2024/0117763 A1* | 4/2024 | Ito | C01B 3/501 |
| 2024/0166505 A1 | 5/2024 | White | |
| 2024/0167417 A1 | 5/2024 | Lin | |
| 2024/0328358 A1* | 10/2024 | Barth | F02C 7/224 |

\* cited by examiner

GAS TURBINE PLANT WITH AMMONIA DECOMPOSITION SYSTEM

CROSS-REFERENCE TO RELATED APPLICATIONS

The present application claims the benefit of priority to Korea Patent Application No. 10-2023-0069526, filed May 30, 2023, and Korea Patent Application No. 10-2023-0089992, filed Jul. 11, 2023, the entire contents of which are incorporated herein for all purposes by this reference.

FIELD

The present disclosure relates to a gas turbine plant with an ammonia decomposition system and more particularly to a gas turbine plant which decomposes ammonia and supplies it as fuel to a combustor of the gas turbine.

BACKGROUND

For the purpose of reducing the emission amount of carbon dioxide in order to preserve global environment, it is a promising option to use hydrogen as a fuel which does not emit carbon dioxide even when combusted. However, compared to a fuel such as liquefied natural gas which is widely used as a fuel for a gas turbine, hydrogen is not easy to transport or store. Therefore, it is being considered that ammonia that can be converted to hydrogen is used as a fuel.

Japanese Patent No. 2948351 discloses a gas turbine plant equipped with a decomposition device that heats ammonia and decomposes it into hydrogen and nitrogen. The decomposition device of the gas turbine plant heats ammonia by performing heat exchange between liquid ammonia with pressure increased by a pressure pump and exhaust gas discharged from the gas turbine, thereby thermally decomposing the ammonia into decomposition gas containing hydrogen and nitrogen. This decomposition gas is supplied as it is to a combustor of the gas turbine.

However, the liquid ammonia may not be sufficiently heated by the exhaust gas. In this case, a large amount of ammonia in addition to hydrogen and nitrogen often remains in the decomposition gas. When the decomposition gas is supplied to the combustor of the gas turbine and the residual ammonia is combusted, there is a problem that a large amount of nitrogen oxides (NOx) is generated.

SUMMARY

The purpose of the present disclosure is to provide a gas turbine plant that decomposes ammonia and supplies it as fuel to a combustor of a gas turbine. The gas turbine plant supplies sufficient heat to the ammonia in order to thermally decompose the ammonia effectively, and separates the residual ammonia present in the decomposition gas and supplies it to a combustor of the gas turbine.

The technical problem to be overcome in this document is not limited to the above-mentioned technical problems. Other technical problems not mentioned can be clearly understood from those described below by a person having ordinary skill in the art.

One embodiment is a gas turbine plant with an ammonia decomposition system. The gas turbine plant includes: a storage tank configured to store liquid ammonia; a supply pump configured to supply the liquid ammonia of the storage tank; a preheater configured to preheat the liquid ammonia supplied by the supply pump; a vaporizer configured to vaporize the liquid ammonia preheated by the preheater; a superheater configured to superheat the gaseous ammonia vaporized by the vaporizer; a decomposition reactor configured to thermally decompose the gaseous ammonia superheated by the superheater; a separator configured to separate residual ammonia from the decomposition gas decomposed by the decomposition reactor; a first combustor configured to generate combustion gas in such a way as to supply heat to the decomposition reactor; and a first heat exchanger in which heat exchange occurs between the combustion gas and an oxidant supplied to the first combustor. Synthesis gas consisting of hydrogen and nitrogen with the residual ammonia removed by the separator is supplied to a second combustor of a gas turbine.

The first heat exchanger may be disposed downstream of the decomposition reactor. In the first heat exchanger, the oxidant and the combustion gas that has passed through the decomposition reactor may exchange heat.

The oxidant may be air. The gas turbine plant may further include blower that supplies the air to the first heat exchanger.

A temperature of the oxidant heated by the first heat exchanger may be higher than a temperature of the gaseous ammonia at an inlet of the decomposition reactor.

Exhaust gas that is discharged from the gas turbine may be supplied to a heat recovery steam generator. The gas turbine plant may further include a second heat exchanger in which heat exchange occurs between the oxidant and water or steam heated by heat of the exhaust gas in the heat recovery steam generator.

The first heat exchanger and the second heat exchanger may be arranged in series.

The oxidant may pass through the second heat exchanger and the first heat exchanger in turn and then may be supplied to the first combustor.

The heat recovery steam generator may include a low-pressure steam generation system for generating low-pressure steam, an intermediate-pressure steam generation system for generating intermediate-pressure steam, a selective catalytic reduction (SCR) device, a reheat steam generation system for generating reheat steam, and a high-pressure steam generation system for generating high-pressure steam. The water of steam may be extracted from any one of the low-pressure steam generation system, the intermediate-pressure steam generation system, and the high-pressure steam generation system, and may be supplied to the second heat exchanger.

The water or steam extracted from the heat recovery steam generator to the second heat exchanger may be recovered back to the heat recovery steam generator.

The steam generated by the heat of the exhaust gas in the heat recovery steam generator may be supplied to a steam turbine and drives the steam turbine, and then may flow into a condenser, and the water condensed in the condenser may be supplied back to the heat recovery steam generator. The water or steam extracted from the heat recovery steam generator to the second heat exchanger may be recovered back to downstream of the condenser.

The gas turbine plant may further include a first damper installed in an outlet through which the combustion gas is discharged from the decomposition reactor or in a discharge line through which the combustion gas discharged from the decomposition reactor flows.

The first damper may be closed when an operation of the gas turbine plant is stopped or when only the first combustor is operated before the gas turbine plant is started.

When the first damper is closed, a temperature of the decomposition reactor may be maintained or the decomposition reactor may be preheated.

The gas turbine plant may further include a second damper installed in an outlet through which the combustion gas is discharged from the first heat exchanger or in a discharge line through which the combustion gas discharged from the first heat exchanger flows.

The second damper may be closed when an operation of the gas turbine plant is stopped or when only the first combustor is operated before the gas turbine plant is started.

When the second damper is closed, temperatures of the decomposition reactor and the first heat exchanger may be maintained or the decomposition reactor and the first heat exchanger may be preheated.

A portion of the decomposition gas decomposed by the decomposition reactor or a portion of the synthesis gas with the residual ammonia removed by the separator may be supplied to the first combustor and may be combusted.

A portion of the decomposition gas or a portion of the synthesis gas may be expanded by a gas expander before being supplied to the first combustor. Exhaust gas that is discharged from the gas turbine may be supplied to a heat recovery steam generator. The gas expander may have a drive shaft that is mechanically connected to a pump for pressurizing water in the heat recovery steam generator.

According to the embodiment, the ammonia decomposition system includes the preheater, the vaporizer, and the superheater, which heat ammonia prior to the decomposition reactor. The combustion gas generated by the first combustor supplies heat to the decomposition reactor. Accordingly, sufficient heat can be supplied to the ammonia and the ammonia can be thermally decomposed effectively at a high temperature.

Also, since the combustion gas and the oxidant supplied to the first combustor exchange heat, a heat source of the combustion gas remaining after supplying heat to the decomposition reactor can be effectively recovered. Also, as the oxidant is heated, the amount of fuel used for a target temperature of the combustion gas in the first combustor can be reduced.

Also, the oxidant can be additionally heated by using the water or steam heated by the heat of the exhaust gas in the heat recovery steam generator.

Also, the damper for limiting the flow of the combustion gas is included. As a result, the damper is closed when the operation of the gas turbine plant is stopped, so that the temperature of the decomposition reactor and/or the first heat exchanger can be maintained. Alternatively, when the first combustor is operated before the gas turbine plant is started and the damper is closed, the decomposition reactor and/or the first heat exchanger can be preheated.

Also, a shaft power is obtained from the high-temperature and high-pressure gas by expanding a portion of the decomposition gas or a portion of the synthesis gas supplied to the first combustor. The shaft power is used for the pump for pressurizing the water of the heat recovery steam generator, so that the power consumption of the pump of the heat recovery steam generator can be reduced.

The effect of the present disclosure is not limited to the above effects and should be construed as including all the effects that can be inferred from the configuration of the present disclosure disclosed in the detailed description or claims of the present disclosure.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Figure 1:
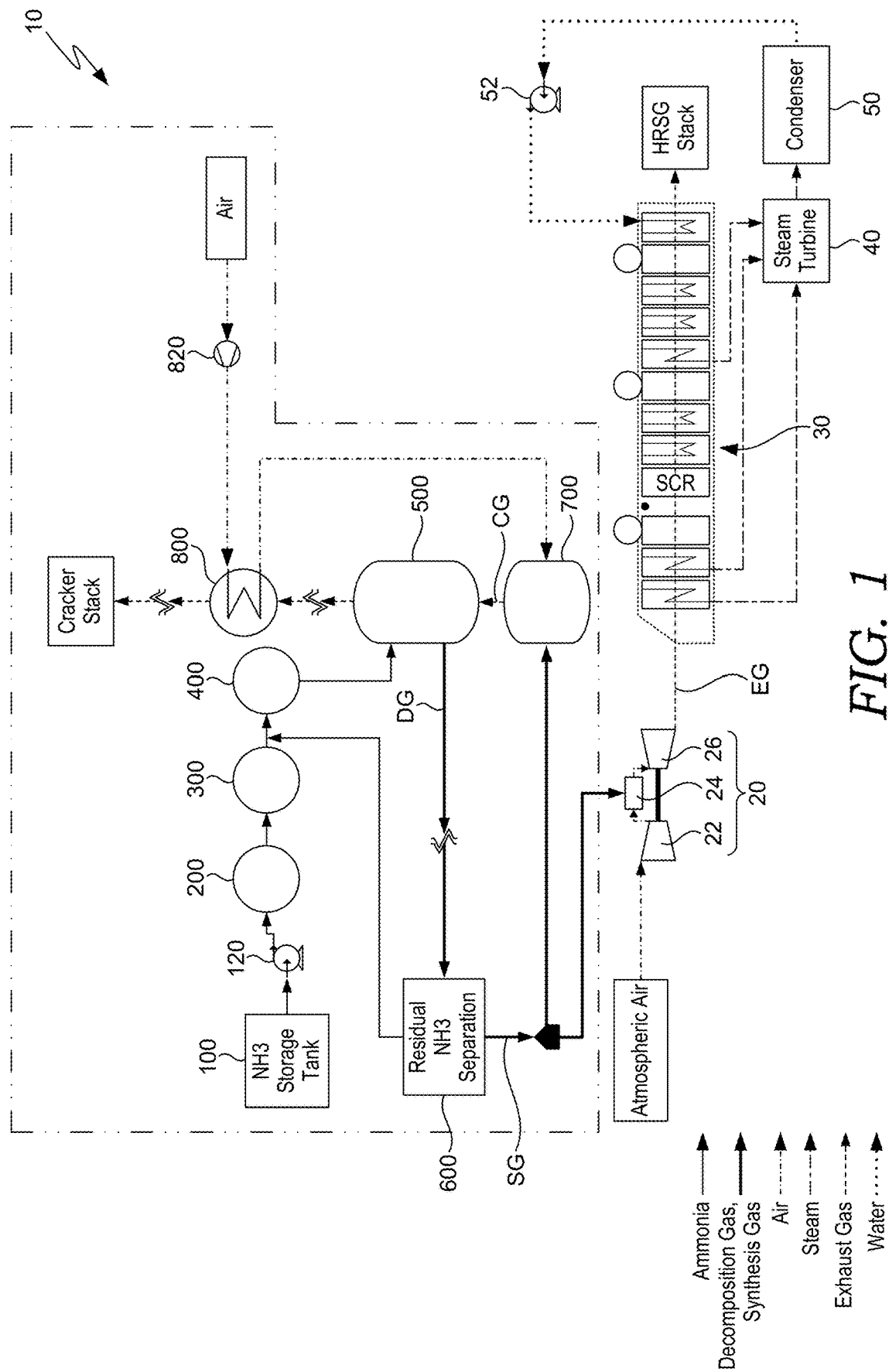
FIG. 1 is a schematic diagram of a gas turbine plant with an ammonia decomposition system according to an embodiment of the present disclosure.

Hereinafter, preferable embodiments of a gas turbine plant with an ammonia decomposition system will be described with reference to accompanying drawings.

Also, the below-mentioned terms are defined in consideration of the functions in the present disclosure and may be changed according to the intention of users or operators or custom. The following embodiments do not limit the scope of the present disclosure and are merely exemplary of the components presented in the claims of the present disclosure.

Parts irrelevant to the description will be omitted for a clear description of the present disclosure. The same or similar reference numerals will be assigned to the same or similar components throughout this specification. Throughout this specification, when it is mentioned that a portion "includes" an element, it means that the portion does not exclude but further includes other elements unless there is a special opposite mention.

First, a gas turbine plant including an ammonia decomposition system according to an embodiment of the present disclosure will be described with reference to FIG. 1.

The gas turbine plant according to the embodiment generally includes an ammonia decomposition system 10, a gas turbine 20, a heat recovery steam generator (HRSG) 30, a steam turbine 40, and a condenser 50.

The ammonia decomposition system 10 includes a storage tank 100, a supply pump 120, a preheater 200, a vaporizer 300, a superheater 400, a decomposition reactor 500, a separator 600, and a first combustor 700.

The gas turbine 20 includes a compressor 22 for compressing air to high pressure, a second combustor 24 for mixing the air compressed by the compressor 22 with fuel and for combusting, and a turbine 26 for generating power while rotating turbine blades by using high-temperature and high-pressure combustion gas discharged from the second combustor 24.

In the embodiment of the present disclosure, synthesis gas based on hydrogen decomposed in the ammonia decomposition system 10 as a main component is supplied as fuel for the second combustor 24. It is shown in the drawing that only the synthesis gas is supplied. However, in some cases, it is also possible that the synthesis gas and natural gas are supplied to the second combustor 24 together and mixed and combusted.

Exhaust gas (EG) discharged from the turbine 26 of the gas turbine 20 is supplied to the heat recovery steam generator 30 and vaporizes water into steam within the heat recovery steam generator 30. The steam generated by heat of the exhaust gas (EG) in the heat recovery steam generator 30 is supplied to the steam turbine 40 and drives the steam turbine to produce electric power. After driving the steam turbine 40, the steam flows into the condenser 50 and is condensed by cooling water, and the water condensed in the condenser 50 is supplied back to the heat recovery steam generator 30. There may be provided a condensate pump 52 which supplies the water condensed in the condenser 50 to the heat recovery steam generator 30.

Hereinafter, each component of the ammonia decomposition system 10 will be described in detail. FIG. 1 shows a flow of ammonia or ammonia-decomposed gas passing through the components of the ammonia decomposition system 10, and adjacent components will be connected to each other through connection pipes, etc.

The storage tank 100 stores liquid ammonia, and the supply pump 120 increases the pressure of the liquid ammonia of the storage tank 100 and supplies the liquid ammonia to the preheater 200.

Subsequently, the preheater 200, the vaporizer 300, and the superheater 400 are configured to vaporize and heat the liquid ammonia prior to the decomposition reactor 500. Specifically, the preheater 200 preheats the liquid ammonia supplied by the supply pump 120. The vaporizer 300 vaporizes the liquid ammonia preheated by the preheater 200. The superheater 400 superheats the gaseous ammonia vaporized by the vaporizer 300.

As one example, when the supply pump 120 increases the pressure of the liquid ammonia to 40 atm, a boiling point of the ammonia at 40 atm is around 100° C. In this case, the preheater 200 heats the liquid ammonia to below the boiling point, and the vaporizer 300 heats the liquid ammonia to the boiling point and generates gaseous ammonia. The superheater 400 additionally heats the gaseous ammonia.

The decomposition reactor 500 thermally decomposes the gaseous ammonia superheated by the superheater 400 and generates decomposition gas (DG) containing hydrogen, nitrogen, and residual ammonia. A catalyst that promotes the thermal decomposition of the ammonia may be filled in the decomposition reactor 500. The catalyst has a catalyst component that activates a decomposition reaction, and a carrier that supports the catalyst component. An example of the catalyst component includes particles of precious metal such as Ru, etc., and metal particles including transition metals such as Ni, Co, and Fe, etc. The carrier includes a metal oxide such as $Al_2O_3$, $ZrO_2$, $Pr_2O_3$, $La_2O_3$, MgO, etc. The catalyst is not limited to the catalysts exemplified above as long as the catalyst activates the decomposition reaction of ammonia.

The separator 600 separates residual ammonia from the decomposition gas (DG) decomposed by the decomposition reactor 500. Then, the residual ammonia is removed in the separator 600, the synthesis gas (SG) consisting of hydrogen and nitrogen is supplied to the second combustor 24 of the gas turbine. Here, the residual ammonia separated by the separator 600 may be mixed with the gaseous ammonia vaporized by the vaporizer 300 and may be supplied to the superheater 400. Since ammonia is highly soluble in water, the separator 600 can remove the residual ammonia by dissolving the residual ammonia in water. Also, ammonia is easier to evaporate than water. Therefore, when ammonia water that is obtained by dissolving the residual ammonia in water is heated, gaseous ammonia can be separated again.

Here, a reaction temperature for the thermal decomposition of the ammonia (depending on the catalyst, generally 400° C. to 700° C.) is much higher than a boiling point of ammonia. Therefore, the decomposition reactor 500 requires a relatively high temperature heat source. To this end, the ammonia decomposition system 10 includes the first combustor 700 that generates combustion gas (CG) such that heat is supplied to the decomposition reactor 500. In the embodiment, the combustion gas (CG) generated by the first combustor 700 supplies heat while passing through the decomposition reactor 500. Also, in some cases, the combustion gas (CG) may pass through the preheater 200, the vaporizer 300, or the superheater 400.

The combustion gas (CG) generated from the first combustor 700 generally has a temperature of about 1000° C., which is higher than that of the exhaust gas (EG) discharged from the gas turbine 20. Therefore, by using the combustion gas (CG) with the inclusion of the separate first combustor 700, the ammonia can be effectively thermally decomposed by the decomposition reactor 500 even without using a high-performance catalyst, and the efficiency of the decomposition reactor 500 can be improved.

As such, the ammonia decomposition system 10 may include the preheater 200, the vaporizer 300, and the superheater 400, which are for heating the ammonia before the decomposition reactor 500, and the combustion gas (CG) generated by the first combustor 700 supplies heat to the decomposition reactor 500. Accordingly, sufficient heat can be supplied to the ammonia and the ammonia can be thermally decomposed effectively.

Accordingly, there is not much residual ammonia in the decomposition gas (DG), and the residual ammonia is reliably removed through the separator 600 and the decomposition gas (DG) is supplied to the second combustor 24, thereby reducing nitrogen oxides in the exhaust gas (EG).

Separate fuel such as fossil fuel may be supplied to the first combustor 700. However, it is desirable that a portion of the decomposition gas (DG) or synthesis gas (SG) and the ammonia present in the ammonia decomposition system 10 should be supplied as fuel to the first combustor 700 in order that the system is simplified and carbon dioxide is not emitted. In the embodiment, a portion of the synthesis gas (SG) with the residual ammonia removed by the separator 600 is supplied to the first combustor 700 and is combusted. As such, a portion of the synthesis gas (SG) is supplied as fuel to the first combustor 700, so that no separate fuel such as fossil fuel is required.

The first combustor 700 is also supplied with an oxidant for combustion. Here, the ammonia decomposition system 10 of the present disclosure is provided with a first heat exchanger 800 in which heat exchange occurs between the combustion gas (CG) and the oxidant supplied to the first combustor 700.

In the embodiment, since the first heat exchanger 800 is disposed downstream of the decomposition reactor 500 in the flow of the combustion gas (CG), in the first heat exchanger 800 the oxidant and the combustion gas (CG) that has passed through the decomposition reactor 500 exchange heat. Accordingly, a heat of the combustion gas (CG) remaining after supplying heat to the decomposition reactor 500 can be effectively recovered. Also, as the oxidant is heated, the amount of fuel used for a target temperature of the combustion gas in the first combustor 700 can be reduced.

The oxidant may be air (e.g., atmospheric air), and in this case, a blower 820 that supplies the air to the first heat exchanger 700 may be further included.

Here, it is preferable that the temperature of the oxidant heated by the first heat exchanger 700 should be higher than the temperature of the gaseous ammonia at the inlet of the decomposition reactor 500.

Next, a gas turbine plant including an ammonia decomposition system according to another embodiment of the present disclosure will be described with reference to FIG. 2.

Likewise, the gas turbine plant of the embodiment also generally includes the ammonia decomposition system 10, the gas turbine 20, the heat recovery steam generator 30, the steam turbine 40, and the condenser 50. Hereinafter, the following description will focus on only differences from the embodiment shown in FIG. 1. The components identical to the components of FIG. 1 are denoted by the same reference numerals.

The ammonia decomposition system 10 of the embodiment further includes a second heat exchanger 840 in which heat exchange occurs between the oxidant and water or steam heated by the heat of the exhaust gas (EG) in the heat recovery steam generator 30. That is, the oxidant can be additionally heated by using the water or steam heated by the heat of the exhaust gas (EG) in the heat recovery steam generator 30.

In the embodiment, the first heat exchanger 800 and the second heat exchanger 840 are arranged in series, and the oxidant passes through the second heat exchanger 840 and the first heat exchanger 800 in turn through the blower 820 and then is supplied to the first combustor 700. However, the embodiment is not limited to this. The first heat exchanger 800 and the second heat exchanger 840 may be arranged in parallel.

Figure 2:
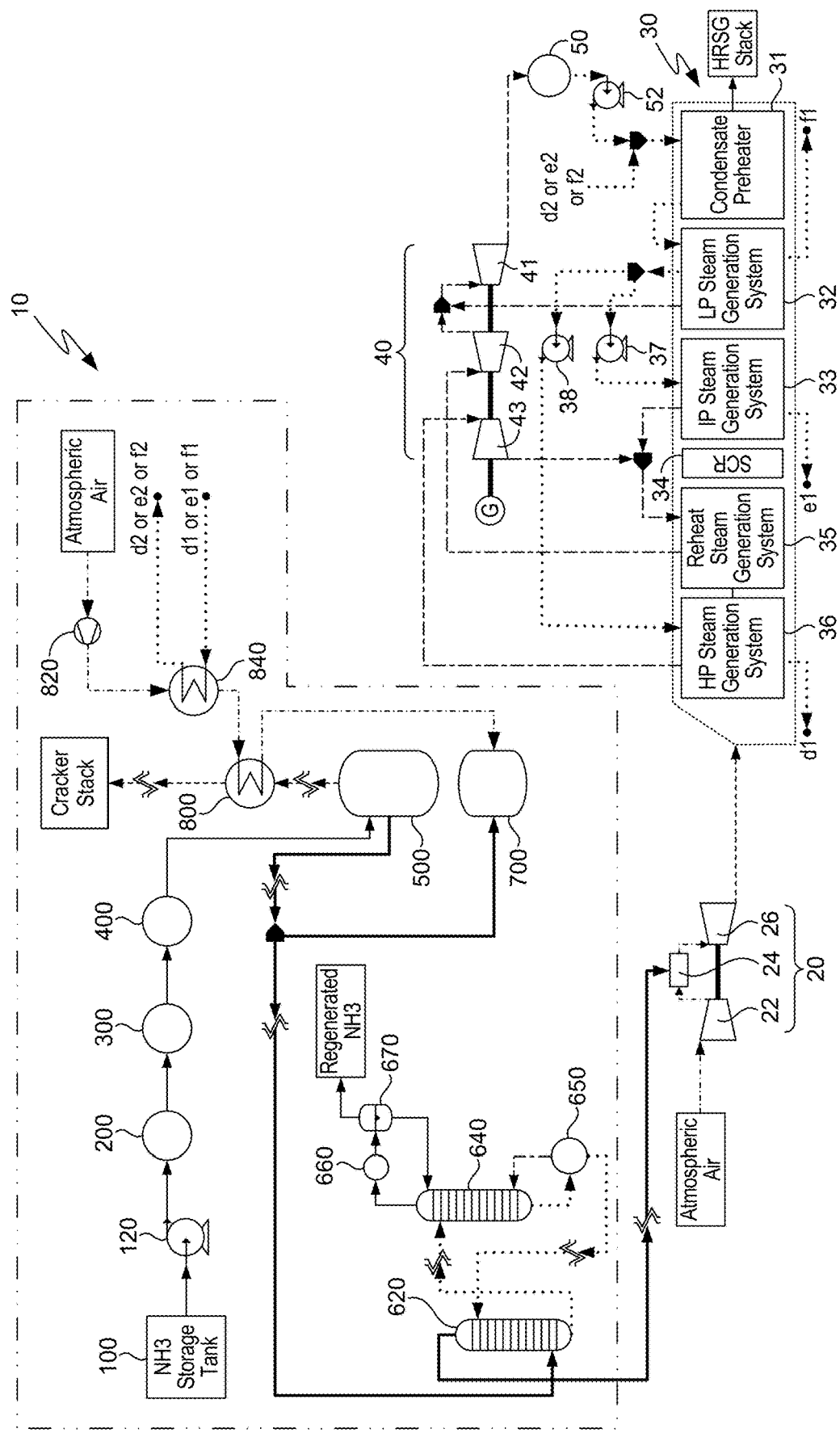
FIG. 2 is a schematic diagram of a gas turbine plant with an ammonia decomposition system according to an embodiment of the present disclosure.

In FIG. 2, the heat recovery steam generator 30 and the steam turbine 40 are shown in more detail. Specifically, the heat recovery steam generator 30 includes a condensate preheater 31 for preheating condensate, a low-pressure steam generation system 32 for generating low-pressure steam, an intermediate-pressure steam generation system 33 for generating intermediate-pressure steam, a selective catalytic reduction (SCR) device 34, a reheat steam generation system 35 for generating reheat steam, and a high-pressure steam generation system 36 for generating high-pressure steam. The low-pressure steam generation system 32 may include an evaporator that evaporates condensate preheated by the condensate preheater 31 into steam and a superheater that superheats the steam. The intermediate-pressure steam generation system 33 may include an economizer that preheats water supplied through an intermediate-pressure pump 37, an evaporator that evaporates the preheated water into steam, and a superheater that superheats the steam. The high-pressure steam generation system 36 may also include an economizer that preheats water supplied through a high-pressure pump 38, an evaporator that evaporates the preheated water into steam, and a superheater that superheats the steam.

The high-pressure steam generated by the high-pressure steam generation system 36 is supplied to a high-pressure turbine 43 and generates a rotational force, and the steam with reduced energy is then supplied to the reheat steam generation system 35 for reheating. The steam from the high-pressure turbine 43 is mixed with the intermediate-pressure steam generated by the intermediate-pressure steam generation system 33 and is heated again in the reheat steam generation system 35. The steam heated in the reheat steam generation system 35 is supplied to an intermediate-pressure turbine 42 and generates a rotational force, and the steam with reduced energy is then mixed with the low-pressure steam generated by the low-pressure steam generation system 32 and is supplied to a low-pressure turbine 41. The steam from the low-pressure turbine 41 flows into the condenser 50. As such, the low-pressure steam, the intermediate-pressure steam, and the high-pressure steam generated in the heat recovery steam generator 30 are supplied to the low-pressure turbine 41, the intermediate-pressure turbine 42, and the high-pressure turbine 43, respectively, so that a rotational force is generated and electricity is generated by the rotational force.

Here, a location where water or steam is extracted from the heat recovery steam generator 30 to the second heat exchanger 840 in order to heat the oxidant may be, as shown in FIG. 2, one of the low-pressure steam generation system 32, the intermediate-pressure steam generation system 33, and the high-pressure steam generation system 36 (d1 or e1 or f1). However, the embodiment is not limited to this. So long as the water or steam has a temperature which allows itself to heat the oxidant, the water or steam can be extracted from any location within the heat recovery steam generator 30.

The water or steam extracted from the heat recovery steam generator 30 to the second heat exchanger 840 may be recovered back to the downstream of the condenser 50 or the heat recovery steam generator 30. In the embodiment, the water after supplying heat to the second heat exchanger 840 is recovered to the downstream of the condenser 50 (d2 or e2 or f2), and is mixed with the water condensed in the condenser 50, and then enter the heat recovery steam generator 30.

Also, in the embodiment, it is shown that a portion of the decomposition gas (DG) decomposed in the decomposition reactor 500, instead of a portion of the synthesis gas (SG), is supplied to the first combustor 700.

The structure of the separator 600 is also shown in more detail. Briefly, the separator 600 may include an ammonia absorption tower 620, an ammonia regeneration tower 640, a reboiler 650, a condenser 660, and a separation tank 670. The ammonia absorption tower 620 separates the residual ammonia included in decomposition gas (DG) by dissolving the residual ammonia in water. The hereby formed synthesis gas (SG) is supplied to the second combustor 24 of the gas turbine, and ammonia water is supplied to the ammonia regeneration tower 640. The ammonia regeneration tower 640 evaporates and regenerates ammonia from the ammonia water through water vapor. The regenerated gaseous ammonia may be cooled and condensed by a predetermined amount while passing through the condenser 660. The separation tank 670 serves to separate the liquid ammonia condensed in the condenser 660 from the uncondensed gaseous ammonia by a density difference. The liquid ammonia separated by the separation tank 670 may be recovered back to the ammonia regeneration tower 640. The remaining water after the evaporation of the ammonia from the ammonia water and the water resulting from the condensation of the water vapor are discharged from the ammonia regeneration tower 640, some of which are supplied to the ammonia absorption tower 620, and the rest of which is evaporated into water vapor while passing through the reboiler 650 and is circulated back to the ammonia regeneration tower 640.

Figure 3:
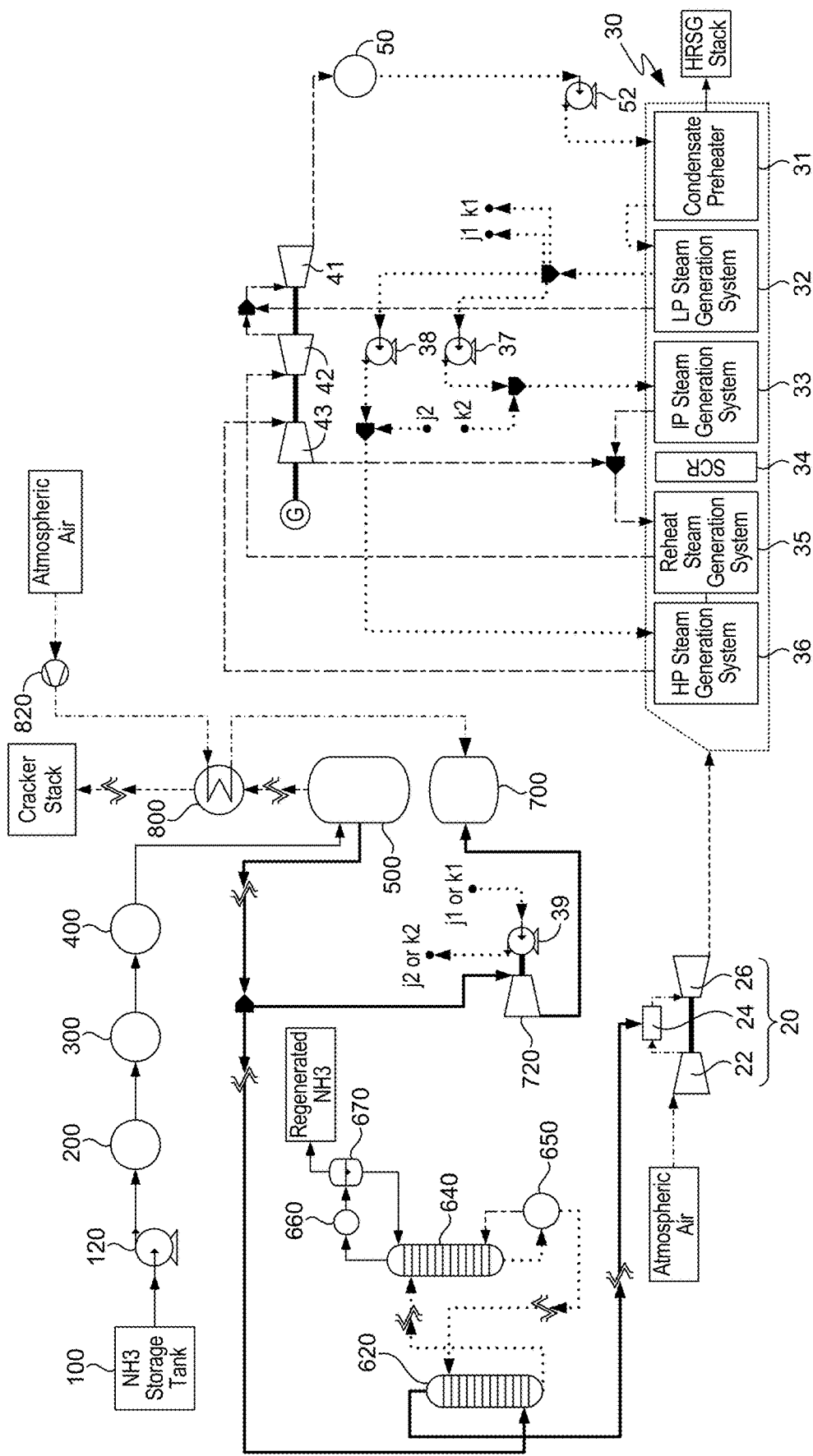
FIG. 3 is a schematic diagram of a gas turbine plant with an ammonia decomposition system according to an embodiment of the present disclosure.

Next, while the embodiment shown in FIG. 3 includes the same configurations as those of the embodiment shown in FIG. 2, the embodiment shown in FIG. 3 further includes a gas expander 720 that expands a portion of the decomposition gas (DG) supplied to the first combustor 700.

A portion of the decomposition gas (DG) may be expanded by the gas expander 720 before being supplied to the first combustor 700, thereby enabling to recover energy from the high-temperature and high-pressure gas. In particular, in the embodiment, the gas expander 720 has a drive shaft that is mechanically connected to a pump 39 for pressurizing water in the heat recovery steam generator 30. In other words, the pump 39 engaged with the shaft of the gas expander 720 can be operated by using a shaft power obtained by expanding the high-temperature and high-pressure gas through the gas expander 720. Accordingly, the power consumption of the pump (e.g., the intermediate-pressure pump 37 and the high-pressure pump 38) of the heat recovery steam generator 30 can be reduced.

FIG. 3 shows that water (j1 or k1) before entering the intermediate-pressure pump 37 and the high-pressure pump 38 is pressed by the pump 39 and then joins (j2 or k2) the downstream of the intermediate-pressure pump 37 or the downstream of the high-pressure pump 38.

According to the embodiment, when a portion of the discharge gas (DG) is supplied to the first combustor 700, it is possible that the portion of the discharge gas (DG) is expanded by the gas expander before being supplied to the first combustor 700.

Figure 4:
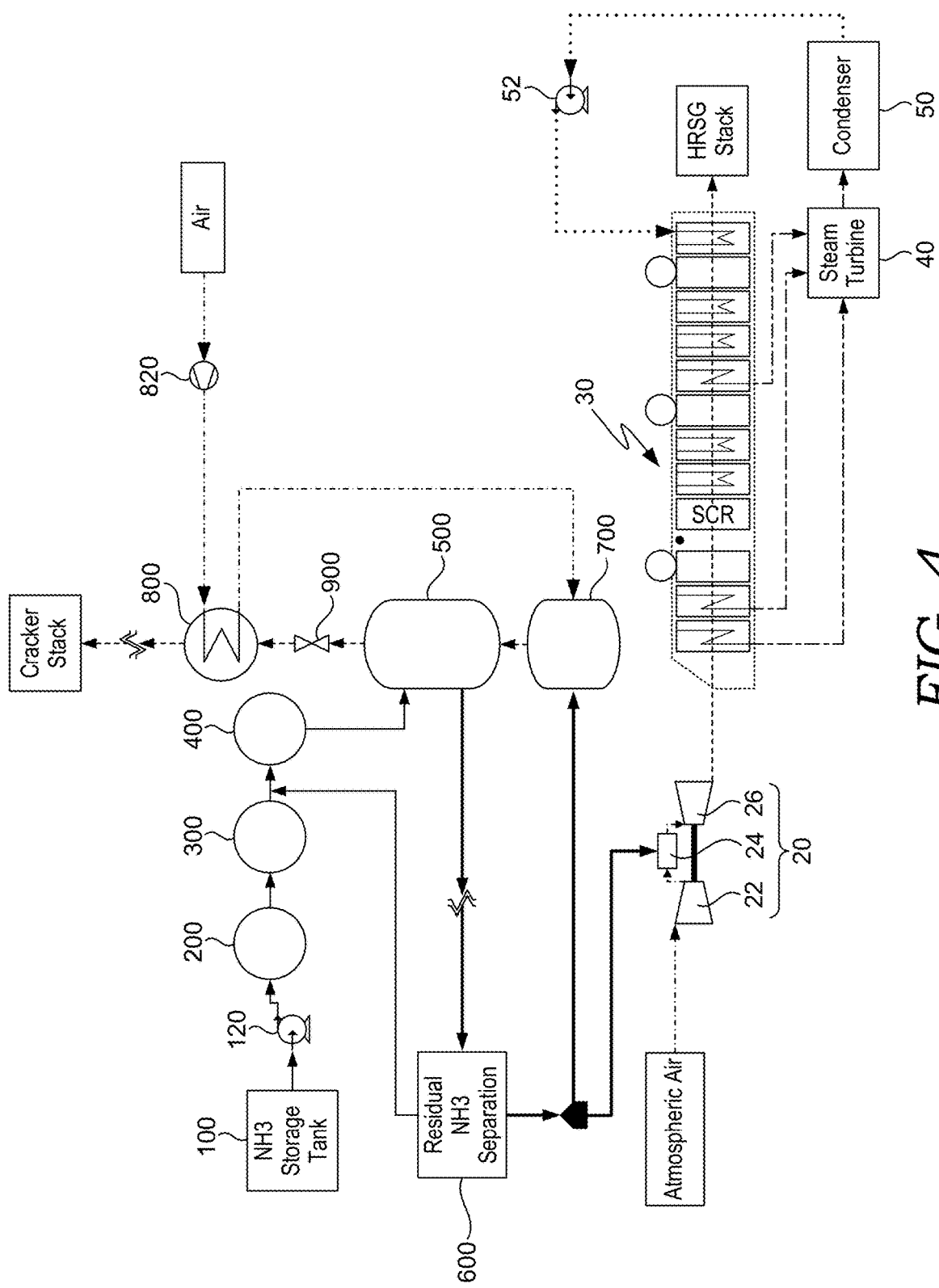
FIG. 4 is a schematic diagram of a gas turbine plant with an ammonia decomposition system according to an embodiment of the present disclosure.

Next, while the embodiment shown in FIG. 4 includes the same configurations as those of the embodiment shown in FIG. 1, the embodiment shown in FIG. 4 further includes a first damper 900 installed in an outlet through which the combustion gas (CG) is discharged from the decomposition reactor 500 or in a discharge line through which the combustion gas (CG) discharged from the decomposition reactor 500 flows. The first damper 900 may be a type of a valve for controlling the flow rate of gas.

When the first damper 900 is open, the combustion gas (CG) flows from the decomposition reactor 500 to the first heat exchanger 800. When the first damper 900 is closed, the combustion gas (CG) is limited from flowing and remains within the decomposition reactor 500.

In particular, the first damper 900 may be closed when the operation of the gas turbine plant is stopped or when only the first combustor 700 is operated before the gas turbine plant is started. As such, in the case where the first damper 900 is closed when the operation of the gas turbine plant is stopped, the temperature of the decomposition reactor 500 can be maintained without falling while the previously generated combustion gas (CG) remains within the decomposition reactor 500 even though the first combustor 700 does not operate. This enables the gas turbine plant to operate quickly when the gas turbine plant is started again. In addition, when the first combustor 700 is operated before the gas turbine plant is started and the first damper 900 is closed, the combustion gas (CG) generated in the first combustor 700 may preheat the decomposition reactor 500 while entering and remaining in the decomposition reactor 500.

Figure 5:
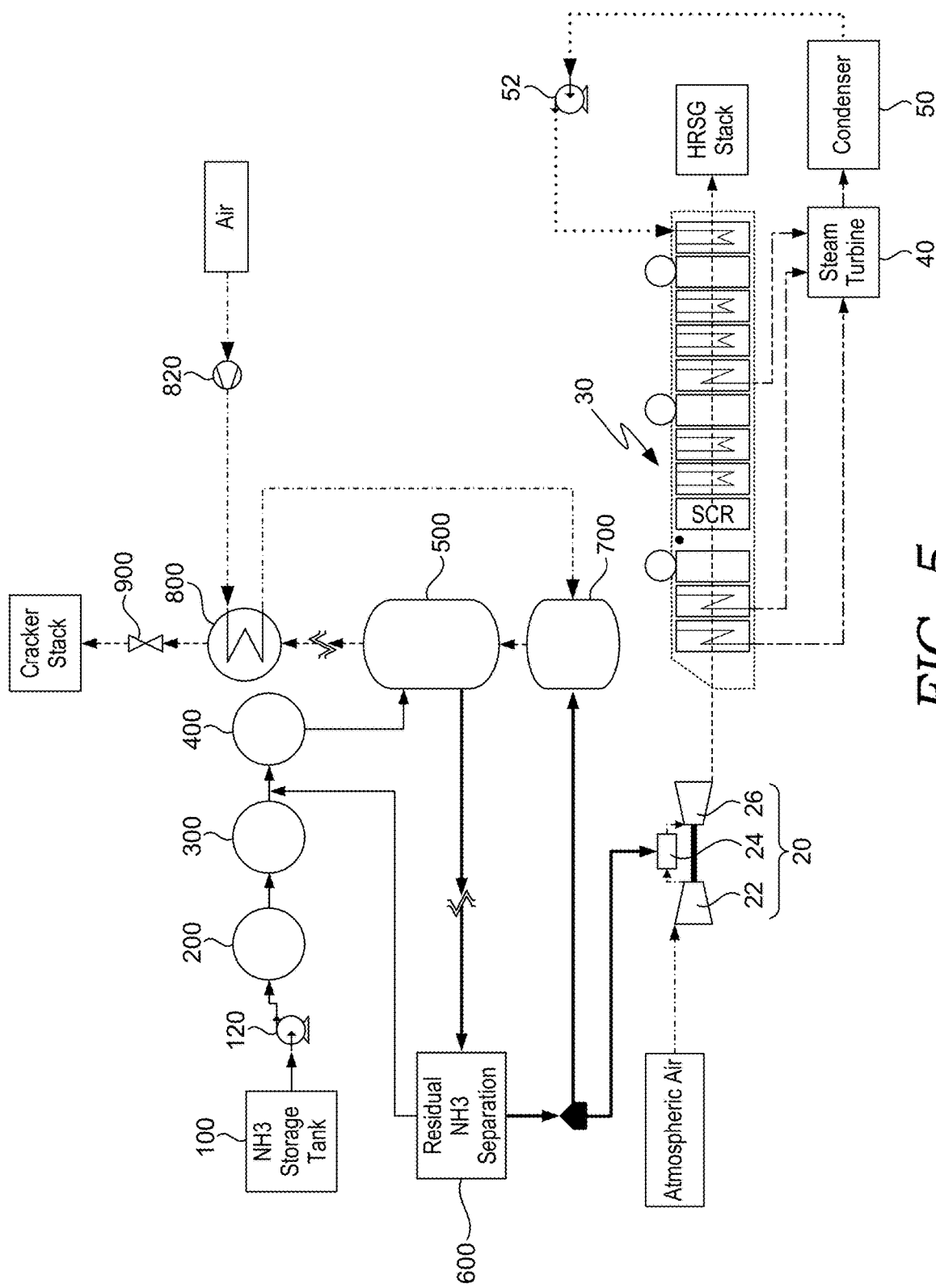
FIG. 5 is a schematic diagram of a gas turbine plant with an ammonia decomposition system according to an embodiment of the present disclosure.

Finally, while the embodiment shown in FIG. 5 includes the same configurations as those of the embodiment shown in FIG. 1, the embodiment shown in FIG. 5 further includes a second damper 920 installed in an outlet through which the combustion gas (CG) is discharged from the first heat exchanger 800 or in a discharge line through which the combustion gas (CG) discharged from the first heat exchanger 800 flows.

When the second damper 920 is open, the combustion gas (CG) is discharged from the first heat exchanger 800 to a stack. When the second damper 920 is closed, the combustion gas (CG) is limited from flowing and remains within the decomposition reactor 500 and the first heat exchanger 800.

In particular, the second damper 920 may be closed when the operation of the gas turbine plant is stopped or when only the first combustor 700 is operated before the gas turbine plant is started. As such, in the case where the second damper 920 is closed when the operation of the gas turbine plant is stopped, the temperatures of the decomposition reactor 500 and the first heat exchanger 800 can be maintained without falling while the combustion gas (CG) remains within the decomposition reactor 500 and the first heat exchanger 800. In addition, when the first combustor 700 is operated before the gas turbine plant is started and the second damper 920 is closed, the combustion gas (CG) generated in the first combustor 700 may preheat the decomposition reactor 500 and the first heat exchanger 800 while entering and remaining in the decomposition reactor 500 and the first heat exchanger 800.

Although it has been described above that FIG. 4 includes only the first damper 900 and FIG. 5 includes only the second damper 920, in some cases, both the first damper 900 and the second damper 920 may be included, and then the temperature of the decomposition reactor 500 and the temperature of the first heat exchanger 800 may be controlled separately.

The present invention is not limited to the described specific embodiments and descriptions described above. Various modifications can be made by anyone skilled in the art without departing from the subject matter of the present invention as defined by the appended claims. Such modifications fall within the scope of protection of the present invention.

REFERENCE NUMERALS

10: Ammonia Decomposition System
20: Gas Turbine
22: Compressor
24: Second Combustor
26: Turbine
30: Heat Recovery Steam Generator
31: Condensate Preheater
32: Low-Pressure Steam Generation System
33: Intermediate-Pressure Steam Generation System
34: Selective Catalytic Reduction (SCR) Device
35: Reheat Steam Generation System
36: High-Pressure Steam Generation System
37: Intermediate-Pressure Pump
38: High-Pressure Pump
39: Pump
40: Steam Turbine
41: Low-Pressure Turbine
42: Intermediate-Pressure Turbine
43: High-Pressure Turbine
50: Condenser
52: Condensate Pump
100: Storage Tank
120: Supply Pump
200: Preheater
300: Vaporizer
400: Superheater
500: Decomposition Reactor
600: Separator
620: Ammonia Absorption Tower
640: Ammonia Regeneration Tower
650: Reboiler
660: Condenser
670: Separation Tank
700: First Combustor
720: Gas Expander
800: First Heat Exchanger 820: Blower
840: Second Heat Exchanger
900: First Damper
920: Second Damper

What is claimed is:

1. A gas turbine plant with an ammonia decomposition system, the gas turbine plant comprising:
 a storage tank configured to store liquid ammonia;
 a supply pump configured to supply the liquid ammonia of the storage tank;
 a preheater configured to preheat the liquid ammonia supplied by the supply pump;
 a vaporizer configured to vaporize the liquid ammonia preheated by the preheater;
 a superheater configured to superheat the gaseous ammonia vaporized by the vaporizer;
 a decomposition reactor configured to thermally decompose the gaseous ammonia superheated by the superheater;
 a separator configured to separate residual ammonia from the decomposition gas decomposed by the decomposition reactor;
 a first combustor configured to generate combustion gas in such a way as to supply heat to the decomposition reactor; and
 a first heat exchanger in which heat exchange occurs between the combustion gas and an oxidant supplied to the first combustor,
 wherein synthesis gas consisting of hydrogen and nitrogen with the residual ammonia removed by the separator is supplied to a second combustor of a gas turbine.

2. The gas turbine plant with an ammonia decomposition system of claim 1, wherein the first heat exchanger is disposed downstream of the decomposition reactor, and wherein, in the first heat exchanger, the oxidant and the combustion gas that has passed through the decomposition reactor exchange heat.

3. The gas turbine plant with an ammonia decomposition system of claim 1, wherein the oxidant is air, and further comprising a blower that supplies the air to the first heat exchanger.

4. The gas turbine plant with an ammonia decomposition system of claim 1, wherein a temperature of the oxidant heated by the first heat exchanger is higher than a temperature of the gaseous ammonia at an inlet of the decomposition reactor.

5. The gas turbine plant with an ammonia decomposition system of claim 1, wherein exhaust gas that is discharged from the gas turbine is supplied to a heat recovery steam generator, and further comprising a second heat exchanger in which heat exchange occurs between the oxidant and water or steam heated by heat of the exhaust gas in the heat recovery steam generator.

6. The gas turbine plant with an ammonia decomposition system of claim 5, wherein the first heat exchanger and the second heat exchanger are arranged in series.

7. The gas turbine plant with an ammonia decomposition system of claim 6, wherein the oxidant passes through the second heat exchanger and the first heat exchanger in turn and then is supplied to the first combustor.

8. The gas turbine plant with an ammonia decomposition system of claim 5,
 wherein the heat recovery steam generator includes a low-pressure steam generation system for generating low-pressure steam, an intermediate-pressure steam generation system for generating intermediate-pressure steam, a selective catalytic reduction (SCR) device, a reheat steam generation system for generating reheat steam, and a high-pressure steam generation system for generating high-pressure steam, and
 wherein the water of steam is extracted from any one of the low-pressure steam generation system, the intermediate-pressure steam generation system, and the high-pressure steam generation system, and is supplied to the second heat exchanger.

9. The gas turbine plant with an ammonia decomposition system of claim 5, wherein the water or steam extracted from the heat recovery steam generator to the second heat exchanger is recovered back to the heat recovery steam generator.

10. The gas turbine plant with an ammonia decomposition system of claim 5,
 wherein the steam generated by the heat of the exhaust gas in the heat recovery steam generator is supplied to a steam turbine and drives the steam turbine, and then flows into a condenser, and the water condensed in the condenser is supplied back to the heat recovery steam generator, and
 wherein the water or steam extracted from the heat recovery steam generator to the second heat exchanger is recovered back to downstream of the condenser.

11. The gas turbine plant with an ammonia decomposition system of claim 1, further comprising a first damper installed in an outlet through which the combustion gas is discharged from the decomposition reactor or in a discharge line through which the combustion gas discharged from the decomposition reactor flows.

12. The gas turbine plant with an ammonia decomposition system of claim 11, wherein the first damper is closed when an operation of the gas turbine plant is stopped or when only the first combustor is operated before the gas turbine plant is started.

13. The gas turbine plant with an ammonia decomposition system of claim 12, wherein, when the first damper is closed, a temperature of the decomposition reactor is maintained or the decomposition reactor is preheated.

14. The gas turbine plant with an ammonia decomposition system of claim 1, further comprising a second damper installed in an outlet through which the combustion gas is discharged from the first heat exchanger or in a discharge line through which the combustion gas discharged from the first heat exchanger flows.

15. The gas turbine plant with an ammonia decomposition system of claim 14, wherein the second damper is closed when an operation of the gas turbine plant is stopped or when only the first combustor is operated before the gas turbine plant is started.

16. The gas turbine plant with an ammonia decomposition system of claim 15, wherein, when the second damper is closed, temperatures of the decomposition reactor and the first heat exchanger are maintained or the decomposition reactor and the first heat exchanger are preheated.

17. The gas turbine plant with an ammonia decomposition system of claim 1, wherein a portion of the decomposition gas decomposed by the decomposition reactor or a portion of the synthesis gas with the residual ammonia removed by the separator is supplied to the first combustor and is combusted.

18. The gas turbine plant with an ammonia decomposition system of claim 17,
 wherein a portion of the decomposition gas or a portion of the synthesis gas is expanded by a gas expander before being supplied to the first combustor, wherein exhaust gas that is discharged from the gas turbine is supplied to a heat recovery steam generator, and wherein the gas expander has a drive shaft that is mechanically connected to a pump for pressurizing water in the heat recovery steam generator.

\* \* \* \* \*